United States Patent
Poppe et al.

(10) Patent No.: US 11,807,352 B2
(45) Date of Patent: Nov. 7, 2023

(54) METHOD FOR JOINING TWO SUBSTANTIALLY PLANAR FIBER-COMPOSITE STRUCTURAL COMPONENTS WITH EACH OTHER

(71) Applicant: Airbus Operations GmbH, Hamburg (DE)

(72) Inventors: Andreas Poppe, Hamburg (DE); Hermann Benthien, Hamburg (DE); Thomas Beumler, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/882,841

(22) Filed: Aug. 8, 2022

(65) Prior Publication Data
US 2023/0052939 A1    Feb. 16, 2023

(51) Int. Cl.
*B64C 1/12*       (2006.01)
*B64F 5/10*       (2017.01)
(Continued)

(52) U.S. Cl.
CPC ............ *B64C 1/12* (2013.01); *B29C 65/4825* (2013.01); *B29C 65/562* (2013.01); *B64F 5/10* (2017.01); *B29L 2031/3082* (2013.01)

(58) Field of Classification Search
CPC . B64C 1/12; B64F 5/10; B29C 65/562; B29C 65/71; B29C 65/782;
(Continued)

(56) References Cited

U.S. PATENT DOCUMENTS

| 5,041,318 | A | 8/1991 | Hulls |
| 9,731,453 | B2 * | 8/2017 | Humfeld ............... B29C 66/524 |

(Continued)

FOREIGN PATENT DOCUMENTS

| DE | 102010003356 A1 | 9/2011 |
| EP | 3088152 A1 | 11/2016 |

(Continued)

OTHER PUBLICATIONS

European Search Report, No priority document submitted.

*Primary Examiner* — John L Goff, II
(74) *Attorney, Agent, or Firm* — Greer, Burns & Crain, Ltd.

(57) ABSTRACT

A method for joining two substantially planar fiber-composite structural components, includes stacking the two components on a support jig to overlap along a joining region. A lower component end section within the joining region borders a gap between the upper component and the jig, where the upper component is unsupported by the jig. The gap is bordered on an opposite side of the lower component end section by a filling portion of the upper component or a planar filler element supported by the jig. The lower component is joined to the upper component within the joining region by applying temperature and pressure to the components. A width of the gap allows the upper component to elastically deform along the gap under the pressure and bend down into the gap to abut the jig along the gap and thereby compensate thickness tolerances between the components during the pressure application.

6 Claims, 2 Drawing Sheets

(51) Int. Cl.
*B29C 65/48* (2006.01)
*B29C 65/56* (2006.01)
*B29L 31/30* (2006.01)

(58) Field of Classification Search
CPC . B29C 65/7832; B29C 65/4825; B29C 66/32; B29C 66/1122; B29C 66/128; B29C 66/1282; B29C 66/12821; B29C 66/12822; B29C 66/54; B29C 66/61; B29L 2031/3082; Y02T 50/40
See application file for complete search history.

(56) References Cited

U.S. PATENT DOCUMENTS

| | | | |
|---|---|---|---|
| 2012/0132753 A1* | 5/2012 | Caballero | B64C 1/12 156/305 |
| 2016/0318214 A1 | 11/2016 | Pinillos Martinez et al. | |
| 2019/0283170 A1 | 9/2019 | Kuntz et al. | |

FOREIGN PATENT DOCUMENTS

| | | |
|---|---|---|
| EP | 3539755 A2 | 9/2019 |
| FR | 3072604 A1 | 4/2019 |

* cited by examiner

METHOD FOR JOINING TWO SUBSTANTIALLY PLANAR FIBER-COMPOSITE STRUCTURAL COMPONENTS WITH EACH OTHER

CROSS-REFERENCES TO RELATED APPLICATIONS

This application claims the benefit of the European patent application No. 21190620.1 filed on Aug. 10, 2021, the entire disclosures of which are incorporated herein by way of reference.

FIELD OF THE INVENTION

The present invention pertains to a method for joining two substantially planar fiber-composite structural components with each other. The invention particularly pertains to a method for joining two skin sections of an aircraft with each other.

BACKGROUND OF THE INVENTION

Aircraft fuselages are commonly divided into fuselage sections arranged behind one another along an axial direction of the aircraft, each fuselage section being built up from a set of structural components comprising, amongst others, a skin made from metal or a composite material. The skin corresponds to the outer shell of the fuselage. The skin is rigidly linked to stringers, which are longitudinal structural members that are positioned substantially parallel to the main axis of the fuselage. The stringers reinforce and stiffen the skin in the longitudinal direction. Transverse rigidity is obtained by linking the skin to one or several frames, which are typically substantially circular or oval in shape.

The skin of a fuselage section is often formed by joining two half-shells or smaller skin portions with each other along the circumference of the aircraft. In case of fiber composites, e.g., having a thermoset matrix, one or several layers of adhesive, e.g., adhesive film or foil, are usually brought between an overlap region of the skin portions oriented along the axial direction. The assembly is then cured under application of temperature and pressure within an autoclave. The skin layers are normally fastened to each other in addition by a plurality of mechanical fasteners, in particular, rivets and/or bolts. Usually, the skin portions and the adhesive layers are supplemented by additional layers, e.g., crack stoppers, fiber reinforcement layers, lightning protection layers and so on. The many individual layers may lead to an unfavorable accumulation of manufacturing tolerances in a thickness direction, which may be difficult to compensate in bonding processes without creating significant costs for the manufacturing process.

SUMMARY OF THE INVENTION

Against this background, it is an object of the present invention to find simple solutions for compensating at least some of these tolerances.

According to the invention, a method for joining two planar fiber-composite structural components with each other, in particular two skin sections of an aircraft, comprises arranging a lower structural component of the two structural components beneath an upper structural component of the two structural components on top of a support jig such that the two structural components overlap with each other along a joining region, wherein an end section of the lower structural component within the joining region borders a defined gap between the upper structural component and the support jig, in which the upper structural component is unsupported by the support jig, wherein the defined gap is bordered on an opposite side of the end section of the lower structural component by a filling portion of the upper structural component or a planar filler element being supported by the support jig; and joining the lower structural component to the upper structural component within the joining region by applying temperature and pressure to the structural components, wherein a width of the defined gap is chosen such that the upper structural component elastically deforms along the defined gap under the pressure and bends down into the defined gap such that it abuts the support jig along the defined gap and thereby compensates thickness tolerances between the structural components during the application of the pressure.

Thus, one idea of the present invention is to reduce forces potentially remaining after the joining, bonding and/or curing process, in particular at the joining surfaces and edges resting on top of the support jig, by utilizing specific and controlled elastic deformation of one of the two parts during the bonding/curing process. This principle can be used, for example, during an autoclave process in case of a thermoset matrix material. The elastic deformations will form back to the initial shape as soon as the pressure is removed and the joining process is finished. However, the deformations will compensate any tolerances in a controlled way during the joining process at the joining interface between both components on top of the support jig.

Hence, the invention intentionally provides an adequately large gap between the end section of the lower structural component and the portion of the upper structural component resting next to it on the support jig so that the elasticity of the material lying above the hollow region can be used to compensate tolerances in the joining process. It is to be understood here that the upper structural component does not necessarily have to rest directly on the support jig via an integrally formed filling portion. This function can also be fulfilled by a standalone planar filler element resting underneath the upper structural component on top of the support jig, which serves the same purpose, namely, to provide a flush transition (up to tolerances) between both components on top of the support jig.

According to an embodiment of the invention, the width of the defined gap may be defined depending on the applied pressure, a material of the upper structural component, a thickness of the upper structural component above the defined gap and/or expected tolerances of the structural components.

Hence, the size of the gap is influenced by several different parameters related to the specific aspects of the curing process, in particular pressure, and the configuration of the bonded components (materials, dimensions, geometry etc.).

According to an embodiment of the invention, the two structural components may be bonded to each other by an adhesive, which is brought between them within the joining region prior to the joining.

For example, an adhesive foil or film may be arranged between the two structural components prior to the application of temperature and pressure, which will then bond both components with each other along respective opposing joining surfaces.

According to an embodiment of the invention, the method may further comprise temporarily positioning an insert element within the defined gap prior to and/or during the joining to control leakage of adhesive at the defined gap.

The insert element may have substantially the same horizontal extension as the defined gap such that adhesive basically cannot leak from the mating interface between both components at the gap.

According to an embodiment of the invention, the structural components may follow a stepped shape at respective opposing joining surfaces such that they are complementary formed to each other along the stepped shape. The structural components may be connected via mechanical fasteners at each individual step defined by the stepped shape with the exception of a final step constituting the end section of the lower structural component.

This embodiment of the invention enables a separation of rivet rows along the steps of the lower structural component and the end section of the lower structural component, which then serves as an adhesive pre-connection. An adhesive pre-connection should be as slim as possible in order to optimally transfers loads from and into the structural component and to minimize sheer forces along the bonding surfaces of the component, which could otherwise peel off the material of the component and adversely affect the durability of the bond. On the other hand, to safely set a countersunk rivet through a material layer, the material should have a minimal thickness such that a head and at least some residual cylinder portion of the rivet body can be accommodated within the respective material. Both aspects hence have different and mutually exclusive requirements. To improve this situation, the present solution effectively decouples the last rivet row of the stepped configuration from the adhesive pre-connection and thereby provides benefits for the quality of the bonded-bolted joint.

SUMMARY OF THE INVENTION

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION OF THE PREFERRED EMBODIMENTS

Figure 1:
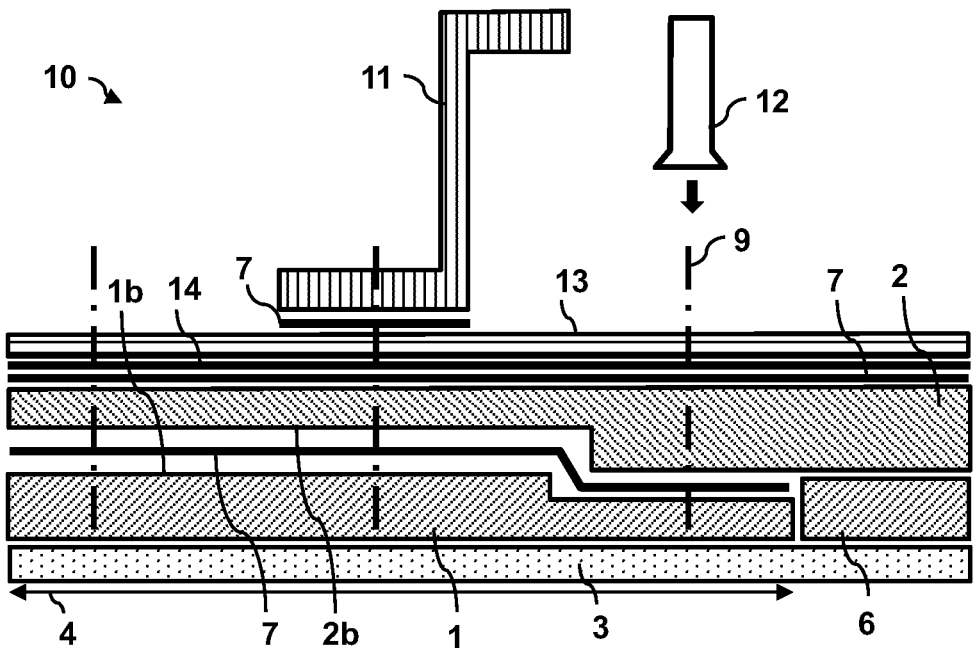
FIG. 1 schematically depicts a cross-sectional view of an exemplary arrangement for joining two planar structural components with each other.
Figure 4:
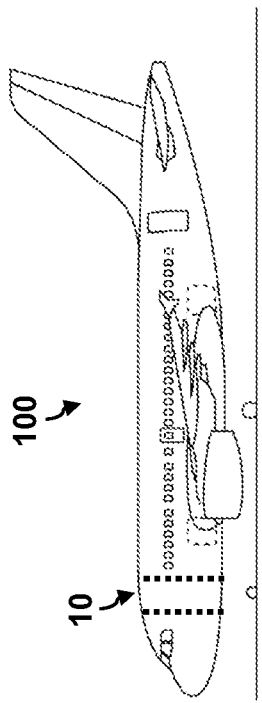
FIG. 4 shows an aircraft having a primary structural component formed based on the arrangement of FIG. 2 or 3.

FIG. 1 schematically depicts a cross-sectional view of an exemplary arrangement for joining two planar structural components 1, 2 with each other to form a primary structural component 10, e.g., of a vehicle or other large object. The two planar structural components 1, 2 may be, for example, two skin sections of a passenger aircraft 100 as exemplarily shown in FIG. 4, which are joined together along a circumferential direction of a fuselage of the aircraft 100.

Normally, aircraft fuselages are formed from a multiplicity of fuselage barrels or barrel segments arranged one after the other along an axial direction of the aircraft 100. Adjacent fuselage barrels are overlapped and then joined with one another in a transverse joint region along a circumferentially running overlap edge. Each barrel segment is usually divided along the circumferential direction into two half-shells or even smaller circumferential arc-like portions, which are also joined to each other. Traditionally, a large number of connecting elements, including butt straps, stringer couplings, clips, brackets and in particular rivets and other mechanical fasteners, are required, which may make the assembly process complicated and cumbersome. And more importantly, each of these elements implies an increase in weight and costs of the assembly. Adhesive and/or substance bonded connections may provide benefits in this respect as the number of mechanical fasteners and other components and the related interfering surface contours can be reduced.

In addition, tolerances usually occur between the overlapping surfaces and edges. This may become particularly relevant in case that many separate material layers and/or components are stacked on top of each other as individual manufacturing tolerances may add up unfavorably.

FIG. 1 shows an exemplary arrangement where two skin sections made of a fiber composite, e.g., carbon fiber reinforced plastic based on a thermoset resin as matrix material, are to be bonded to each other in an autoclave process by application of temperature and pressure. In the depicted arrangement, several layers of adhesive 7 are combined with rows of mechanical fasteners 12 introduced at specific fastening positions 9.

More specifically, a lower structural component 1 is arranged beneath an upper structural component 2 on top of a support jig 3, e.g., a steel framework, such that the two structural components 1, 2 overlap with each other along a joining region 4. A layer of adhesive 7, e.g., adhesive film or foil, is arranged between both structural components 1, 2. As can be seen in FIG. 1, the structural components 1, 2 follow a stepped shape at respective opposing and complementary shaped joining surfaces 1b, 2b. The structural components 1, 2 are joined at each individual step by respective (axially running rows) of mechanical fasteners 12. The lower structural components 1 abuts a planar filler element 6 on the right side that sits flush (except for tolerances) with the lower structural components 1 on top of the support jig 3. Additional layers are placed on top of the upper structural component 2, e.g., a crack stopper 13 and further functional fiber layers 14, as well as a stringer 11. All these elements are bonded to each with additional layers of adhesive 7.

As can be seen in FIG. 1, a multitude of material layers are thus stacked on top of each other, each layer having its individual prefabrication and assembly tolerances. If these tolerances add up unfavorably, residual stresses may remain after the joining process is finished. Moreover, the thickness of the outermost section of the lower structural component 1 (the last step abutting the planar filler element 6 on the right of FIG. 1), may need to be configured unfavorably thick for an adhesive pre-connection in order to accommodate rivets 12.

To improve this situation, joining methods M according to embodiments of the invention follow a different approach as explained now with reference to FIGS. 2 to 5.

In a first step, the method M also comprises under M1 arranging a lower structural component 1 beneath an upper structural component 2 on top of a support jig 3 such that the two structural components 1, 2 overlap with each other along a joining region 4. However, in this case an end section 1a of the lower structural component 1 within the joining region 4 borders a defined gap 5 between the upper structural component 2 and the support jig 3, in which the upper structural component 2 is unsupported by the support jig 3. The defined gap 5 is bordered on an opposite side of the end section 1a of the lower structural component 1 either by planar filler element 6 that is supported by the support jig 3 (similar to FIG. 1) or by a filling portion 2a integrally formed with the upper structural component 2 and also supported by the support jig 3 (which is the variant shown in FIG. 2).

In a second step, the method M comprises, under M2, joining the lower structural component 1 to the upper structural component 2 within the joining region 4 by applying temperature and pressure P to the structural components 1, 2 (e.g., in an autoclave). A width W of the defined gap 5 is chosen such that the upper structural component 2 elastically deforms along the defined gap 5 under the pressure P and bends down into the defined gap 5 such that it abuts the support jig 3 along the defined gap 5 (cf., arrow on the lower right of FIG. 2) and thereby compensates thickness tolerances between the structural components 1, 2 during the application of the pressure P.

Hence, the defined gap 5 serves as an integrated tolerance compensation for the bonding process, which will spring back to the initial shape as soon as the final structural component 10 is removed from the autoclave. The width W of the defined gap 5 can be appropriately defined depending on various parameters of the bonding process, the used materials and the dimensions and shapes of the components. Exemplary parameters comprise, amongst others, the applied pressure P, a material of the upper structural component 2, a thickness of the upper structural component 2 above the defined gap 5 and expected tolerances of the structural components.

Figure 2:
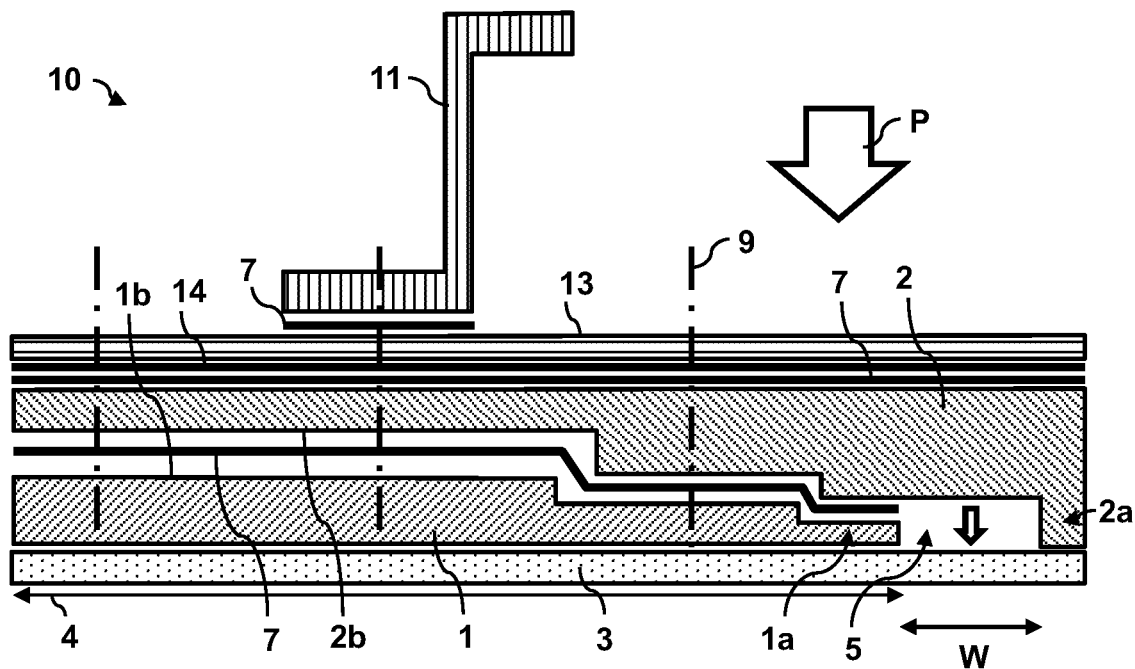
FIG. 2 schematically depicts a cross-sectional view of an arrangement for joining two planar structural components with each other with a method according to an embodiment of the invention.

As can be seen in FIG. 2, the structural components 1, 2 follow a stepped shape at respective opposing and complementary shaped joining surfaces 1b, 2b similarly to the arrangement in FIG. 1. However, in this case the structural components 1, 2 are connected via mechanical fasteners 12 at each individual step defined by the stepped shape with the exception of a final step constituting the end section 1a of the lower structural component, which hence may be configured suitably thin in order to serve as an adhesive pre-connection. The rivet rows are thus separated from the adhesive pre-connection, which implies that the material thicknesses can be optimally chosen in each portion according to the respective requirements.

Figure 3:
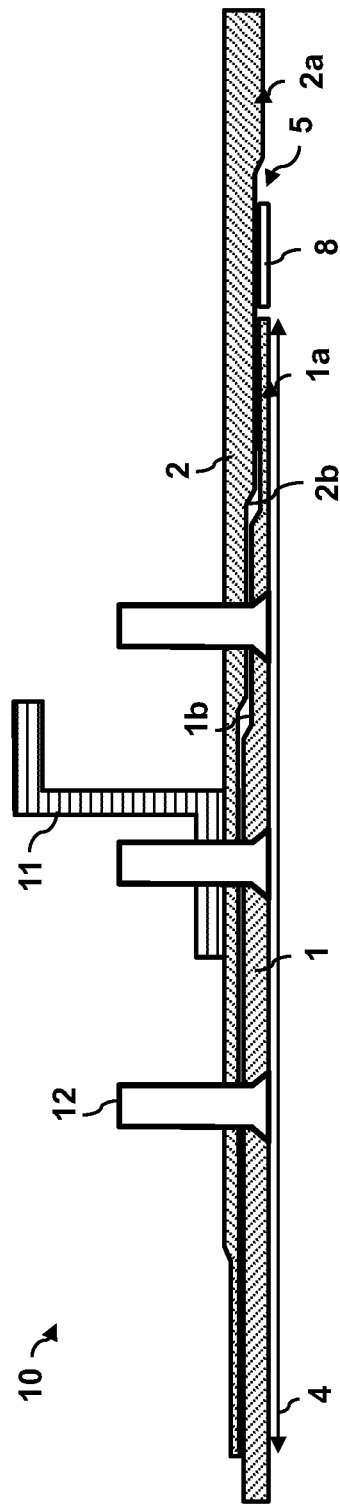
FIG. 3 schematically depicts a cross-sectional view of an arrangement for joining two planar structural components with each other with a method according to another embodiment of the invention.
Figure 5:
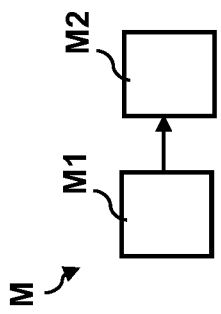
FIG. 5 shows a schematic flow diagram of the method used in FIGS. 2 and 3.

With reference to FIG. 3, a further embodiment of the invention is shown. In this case, an insert element 8 is temporarily placed within the defined gap 5 prior to and/or during the joining M2 to control leakage of adhesive 7 from the defined gap 5 before and during the bonding process. The insert element 8 does not form a bond with the structural components 1, 2 and merely serves as a tool for the fabrication process. In this case, portions of the upper structural component 2 above the defined gap 5 and the insert element 8 will hence elastically deform down upon the insert element 8 abutting the support jig 3. Escape of adhesive is thus effectively controlled without giving up the tolerance compensation of the elastic deformation within the defined gap 5.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the invention and its practical applications, to thereby enable others skilled in the art to best utilize the invention and various embodiments with various modifications as are suited to the particular use contemplated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 lower structural component
1a end section
1b joining surface
2 upper structural component
2a filling portion
2b joining surface
3 support jig
4 joining region
5 defined gap
6 planar filler element
7 adhesive
8 insert element
9 fastening position
10 primary structural component
11 stringer 12 mechanical fastener
13 crack stopper
14 functional fiber layer
100 aircraft
P pressure
M method
M1, M2 method steps

The invention claimed is:

1. A method for joining two substantially planar fiber-composite structural components with each other, the method comprising:
arranging a lower structural component of the two structural components beneath an upper structural component of the two structural components on top of a support jig, such that the two structural components overlap with each other along a joining region,
wherein an end section of the lower structural component within the joining region borders a defined gap between the upper structural component and the support jig in which the upper structural component is unsupported by the support jig,
wherein the defined gap is bordered on an opposite side of the end section of the lower structural component by a filling portion of the upper structural component or a planar filler element being supported by the support jig; and
joining the lower structural component to the upper structural component within the joining region by applying temperature and pressure to the structural components,
wherein a width of the defined gap is chosen such that the upper structural component elastically deforms along the defined gap under the pressure and bends down into the defined gap such that the upper structural component abuts the support jig along the defined gap and thereby compensates thickness tolerances between the structural components during the application of the pressure.

2. The method according to claim 1, wherein the width of the defined gap is defined depending on at least one of the applied pressure, a material of the upper structural component, a thickness of the upper structural component above the defined gap and expected tolerances of the structural components.

3. The method according to claim 1, wherein the two structural components are bonded to each other by an adhesive, which is brought between them within the joining region prior to the joining.

4. The method according to claim 3, further comprising:
temporarily positioning an insert element within the defined gap at least one of prior to or during the joining to control leakage of adhesive at the defined gap.

5. The method according to claim 1,
wherein the structural components follow a stepped shape at respective opposing joining surfaces such that they are complementary formed to each other along the stepped shape,
wherein the structural components are connected via mechanical fasteners at each individual step defined by the stepped shape excepting for a final step constituting the end section of the lower structural component.

6. The method according to claim 1, wherein the two substantially planar fiber-composite structural components comprise two skin sections of an aircraft.

* * * * *